United States Patent
Vaughan

(10) Patent No.: US 11,971,168 B2
(45) Date of Patent: Apr. 30, 2024

(54) IGNITER

(71) Applicant: Vaughan IP Pty Ltd, Echuca (AU)

(72) Inventor: John Robert Vaughan, Bannockburn (AU)

(73) Assignee: VAUGHAN IP PTY LTD, Echuca (AU)

( * ) Notice: Subject to any disclaimer, the term of this patent is extended or adjusted under 35 U.S.C. 154(b) by 541 days.

(21) Appl. No.: 17/271,351

(22) PCT Filed: Aug. 26, 2019

(86) PCT No.: PCT/AU2019/050901
§ 371 (c)(1),
(2) Date: Feb. 25, 2021

(87) PCT Pub. No.: WO2020/041826
PCT Pub. Date: Mar. 5, 2020

(65) Prior Publication Data
US 2021/0199293 A1  Jul. 1, 2021
US 2024/0060642 A2  Feb. 22, 2024

(30) Foreign Application Priority Data

Aug. 27, 2018 (AU) .................. 2018903140
Mar. 5, 2019 (AU) .................. 2019900722

(51) Int. Cl.
*F23Q 2/34* (2006.01)
*F23D 14/40* (2006.01)
(Continued)

(52) U.S. Cl.
CPC ............. *F23Q 2/287* (2013.01); *F23D 14/40* (2013.01); *F23Q 2/34* (2013.01); *F23Q 3/002* (2013.01); *F23D 2207/00* (2013.01)

(58) Field of Classification Search
CPC . F23Q 2/287; F23Q 2/34; F23Q 3/002; F23Q 13/00; F23D 14/40; F23D 14/465; F23D 2207/00; F23D 14/52
(Continued)

(56) References Cited

U.S. PATENT DOCUMENTS 3,449,637 A  6/1969  Suzuki
3,509,388 A  4/1970  Mifune et al.
(Continued)

FOREIGN PATENT DOCUMENTS

GB  1 550 289 A  8/1979
GB  1 550 484 A  8/1979
(Continued)

OTHER PUBLICATIONS

International Search Report and Written Opinion dated Nov. 22, 2019, from application No. PCT/AU2019/050901.
(Continued)

*Primary Examiner* — Danny Nguyen
(74) *Attorney, Agent, or Firm* — FOLEY & LARDNER LLP

(57) ABSTRACT

An igniter device includes a holder for a piezo electric ignition source. A first end of the inner holder is coupled to a piezo electric ignition source including an actuator. A second end of the inner holder has a surface configured to receive a tip of an oxy fuel torch. An attachment structure releasably attaches the igniter device to a support member. The actuator is moveable from a relaxed state to a compressed state to activate the piezo electric ignition source to produce a spark for igniting the oxy fuel torch to produce a flame when the igniter device is attached to the support member.

16 Claims, 8 Drawing Sheets

(51) Int. Cl.
*F23Q 2/28* (2006.01)
*F23Q 3/00* (2006.01)

(58) Field of Classification Search
USPC .......................................................... 361/260
See application file for complete search history.

(56) References Cited

U.S. PATENT DOCUMENTS

| 3,947,731 | A | * | 3/1976 | Vainer | F23Q 3/002 |
| | | | | | 431/255 |
| 4,403,946 | A | * | 9/1983 | Kagawa | F23Q 3/002 |
| | | | | | 431/255 |
| 4,433,358 | A | | 2/1984 | Kubota | |

FOREIGN PATENT DOCUMENTS

| JP | S5196775 U | 8/1976 |
| JP | S53-120274 U | 9/1978 |
| JP | S5831223 A | 2/1983 |

OTHER PUBLICATIONS

Extended European Search Report dated Apr. 25, 2022, 12 pages, issued by the European Patent Office for corresponding European Patent Application No. 19855832.2.

* cited by examiner

IGNITER

CROSS-REFERENCE TO RELATED APPLICATIONS

This application is a national stage entry under U.S.C. § 371 of International application No. PCT/AU2019/050901, filed Aug. 26, 2019, which in turn claims priority of Australian application no. 2018903140, filed Aug. 27, 2018, and Australian application no. 2019900722, filed Mar. 5, 2019, the contents of which are hereby incorporated by reference into the present disclosure.

FIELD OF THE INVENTION

The present invention relates to an igniter device for igniting a welding/cutting tool such as an oxy fuel torch. The present invention particularly relates to an igniter device for igniting or reigniting an extinguished welding/cutting tool and the like.

BACKGROUND

There are many different methods available for welding/cutting metal, some examples of which are: MIG (Metal Inert Gas) welding; arc welding; TIG (Tungsten Inert Gas) welding; FCAW (Flux-Cored Arc Welding); and oxy fuel welding.

Oxy fuel welding/cutting involves combusting a mixture of fuel and oxygen, formed by pressurised streams of fuel and oxygen, to produce a flame. Combusting the fuel in oxygen, as opposed to air, results in a flame temperature that is high enough (approx. 1,900 deg C to 3,500 deg C) to melt metals such as steel.

Oxy fuel welding/cutting can be used to either cut or weld material depending on the temperature of the flame, hence the term welding/cutting.

Acetylene is one of the more common fuels used in oxy fuel welding, however, other fuels may include: gasoline; hydrogen; methylacetylene-propadiene (MAPP); propylene; butane; and propane.

An oxy fuel welding/cutting rig typically comprises: two pressurised and isolated containers, one containing fuel and the other containing oxygen; a welding torch; and a hose, connecting each of the pressurised containers to the welding torch. Each of the pressurised containers typically has a valve for controlling the pressure of fuel/oxygen exiting the pressurised containers and may also have a pressure gauge for displaying the pressure inside the pressurised containers and regulating the operating pressure delivered to the torch.

Typically, the welding torch comprises: an inlet for each of the fuel/oxygen lines; a mixing chamber for mixing the fuel with the oxygen; and a welding torch cutting tip containing an outlet for expelling the fuel/oxygen mixture which is ignited to produce a flame. The inlet, mixing chamber and outlet are communicated with each other via a conduit which passes along the length of the welding torch. The mixing chamber may comprise valves for controlling the flow of fuel and/or oxygen into the mixing chamber. The outlet of the welding torch is typically in the form of a nozzle.

One problem associated with oxy fuel welding/cutting torches is that the flame can often become extinguished due to the torch becoming too close to the workpiece, also known as "flame out". The flame can also be extinguished by dust and/or slag being blown back towards the tip of the welding torch. Both of the above scenarios result in a disruption in flow of fuel and/or oxygen, thus starving the flame of its combustion elements.

It is common practice to reignite an extinguished oxy fuel torch using a hand operated igniter, which is positioned by hand in front of the cutting tip to produce a spark in order to reignite the oxy fuel torch. In performing the above task, the reignition of the flame may result in burning the hand operating the igniter. Therefore, reigniting an extinguished oxy fuel torch can often be a dangerous exercise. It can also be cumbersome and inconvenient to manually reignite the oxy fuel torch, as the process requires both hands: one to hold the torch and the other to operate the igniter.

Standard hand operated igniters generally fall into two categories: flint igniters and piezo electric igniters. Flint igniters produce a spark by converting kinetic energy to heat energy (spark) using mechanical friction. Flint igniters typically incorporate a mechanism which involves striking a piece of metal against a piece of flint to produce a spark. In contrast, piezo electric igniters produce a spark by converting kinetic energy to electrical energy using the piezoelectric effect. The piezoelectric effect is the accumulation of charge in certain solid materials, such as quartz crystals, in response to an applied mechanical stress.

Piezo electric igniters have advantages over flint igniters. Piezo electric igniters are generally considered more reliable and durable than flint igniters due to having fewer number of moving parts and thus fewer potential points of failure. In other words, piezo electric igniters do not rely on friction/wearing action to produce a spark. Furthermore, piezo electric igniters are generally considered more consistent at producing sparks.

In contrast, flint igniters suffer enormously from wear and components are often required to be replaced. Furthermore, flint igniters comprise many small components, including the flint itself, that can become uncoupled from the flint igniter and misplaced.

However, both types of standard hand operated igniters suffer from the same drawbacks, in that they are typically not designed for use at a worksite. Worksites can provide extraordinary conditions for any tool to function in, as they are often messy, dirty and include heavy items that can easily damage tools. As a result, standard hand operated igniters can often be broken, lost or misplaced, due to the extreme conditions experienced at a worksite. Downtime due to broken tools can result in time and cost implications, as well as being greatly frustrating, for the operators of the tools.

Furthermore, standard hand operated igniters require at least one hand to hold and manipulate the igniter to produce a spark. This can result in a difficult and dangerous scenario when simultaneously operating other equipment, such as an oxy fuel torch.

For the above reasons, there exist a need to improve or at least ameliorate some of the above issues pertaining to the use of hand operated igniters at a worksite.

SUMMARY OF THE DISCLOSURE

In one embodiment of the invention, there is disclosed an igniter device comprising: a holder for a piezo electric ignition source, the holder comprising a first end and a second end, wherein the first end of the holder is coupled to a piezo electric ignition source including an actuator, and the second end of the holder has a surface configured to receive a tip of an oxy fuel torch; and an attachment means to releasably attach the igniter device to a support member; wherein, the actuator is moveable from a relaxed state to a compressed state to thereby activate the piezo electric ignition source to produce a spark for igniting the oxy fuel torch to produce a flame when the igniter device is attached to the support member.

In another embodiment of the invention, there is disclosed an igniter device comprising: an outer housing; an inner holder for a piezo electric ignition source, the inner holder being positioned within and movable relative to the outer housing; the inner holder comprising a first end and a second end; the first end of the inner holder being arranged to be coupled to a piezo electric ignition source including an actuator; the second end of the inner holder having a surface configured to receive a tip of an oxy fuel torch and including an aperture to allow passage of gas through the second end of the inner holder; wherein, when the inner holder is moved relative to the outer housing from a first position to a second position, the actuator moves from a relaxed state to a compressed state to thereby activate the piezo electric ignition source to produce a spark for igniting the oxy fuel torch to produce a flame.

In yet another embodiment of the invention, there is disclosed an igniter assembly comprising:
 a) an outer housing;
 b) an inner holder for a piezo electric ignition source, the inner holder being positioned within and movable relative to the outer housing;
 c) the inner holder comprising a first end and a second end;
 d) the first end of the inner holder being coupled to a piezo electric ignition source including an actuator;
 e) the second end of the inner holder having a surface configured to receive a tip of an oxy fuel torch and including an aperture to allow passage of gas through the second end of the inner holder;
 f) wherein, when the inner holder is moved relative to the outer housing from a first position to a second position, the actuator moves from a relaxed state to a compressed state to thereby activate the piezo electric ignition source to produce a spark for igniting the oxy fuel torch to produce a flame.

In a further embodiment of the invention, there is disclosed a method for using an igniter device to ignite an oxy fuel torch, the igniter device comprising:
 a) an outer housing;
 b) an inner holder for a piezo electric ignition source, the inner holder being positioned within and movable relative to the outer housing;
 c) the inner holder comprising a first end and a second end;
 d) the first end of the inner holder being arranged to be coupled to a piezo electric ignition source including an actuator;
 e) the second end of the inner holder having a surface configured to receive a tip of an oxy fuel torch and including an aperture to allow passage of gas through the second end of the inner holder;
 f) wherein the method comprises the steps of:
  engaging the tip of the oxy fuel torch with the second end of the inner holder;
  pressing down the tip of the oxy fuel torch to move the inner holder relative to the outer housing, in order to move the actuator from a relaxed state to a compressed state and thereby activate the piezo electric ignition source to produce a spark which ignites the oxy fuel torch to produce a flame.

In some embodiments of the invention, the outer housing includes an attachment means for releasably attaching the igniter device to a support member.

In some embodiments of the invention, the attachment means is a magnet.

In some embodiments of the invention, the outer housing may have a solid base. In other embodiments, the solid base may be magnetic for releasably magnetically attaching the igniter device to a support member. The solid base may include or consist of a magnet for attachment to a metallic support member, such as a metal work bench.

In some embodiments of the invention, the outer housing and inner holder may comprise inner and outer tubular members with the inner tubular member being positioned within and movable relative to the outer tubular member.

In some embodiments of the invention, at least one of the inner holder and outer housing may be at least partially permeable to allow the passage of gases therethrough.

In other embodiments, both the inner holder and outer housing may be at least partially permeable to allow the passage of gasses therethrough.

In other embodiments, the permeability of both the inner holder and outer housing may extend along the entire axial extent thereof.

In some embodiments of the invention, in an assembled condition, the inner holder and outer housing may be arranged such that the longitudinal axes of both inner holder and outer housing are substantially parallel. In other embodiments, the inner holder and outer housing, when in an assembled condition, may be arranged such that the longitudinal axes of both inner holder and outer housing members are substantially coaxial.

In some embodiments of the invention, the inner holder may move with respect to the outer housing via a linear translation along the parallel longitudinal axis of the inner holder and outer housing.

In some embodiments, the piezo electric ignition source may be any suitable commercially available piezo electric ignition source. The piezo electric ignition source may be releasably coupled to the inner holder by way of a threaded connection.

In some embodiments, the inner holder is returned from a compressed state to a relaxed state, suitably with the use of a biasing means, such as a spring.

The present invention is applicable to methods and tools for welding, cutting and/or heating.

SHORT DESCRIPTION OF THE FIGURES

Notwithstanding any other forms which may fall within the scope of the invention set forth in Summary, specific embodiments will now be described, by way of example only, with reference to the accompanying drawings in which.

DETAILED DESCRIPTION

Figure 1:
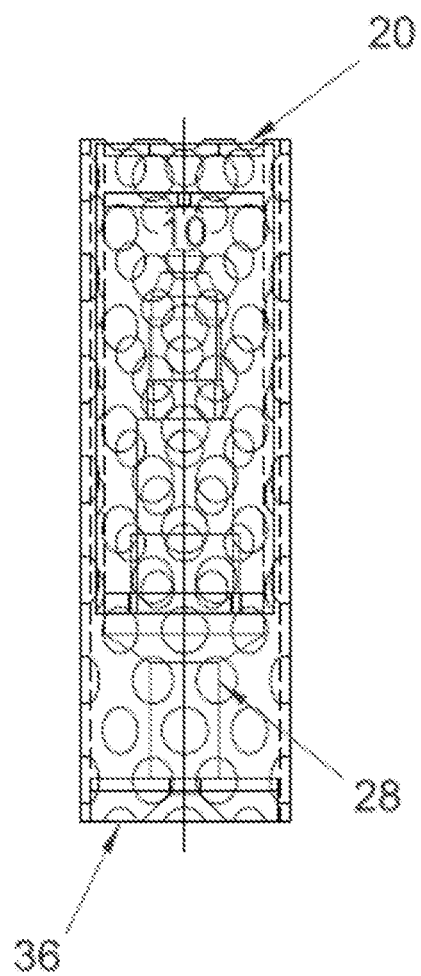
FIG. 1 is a perspective view of an embodiment of an igniter assembly of the invention.
Figure 2:
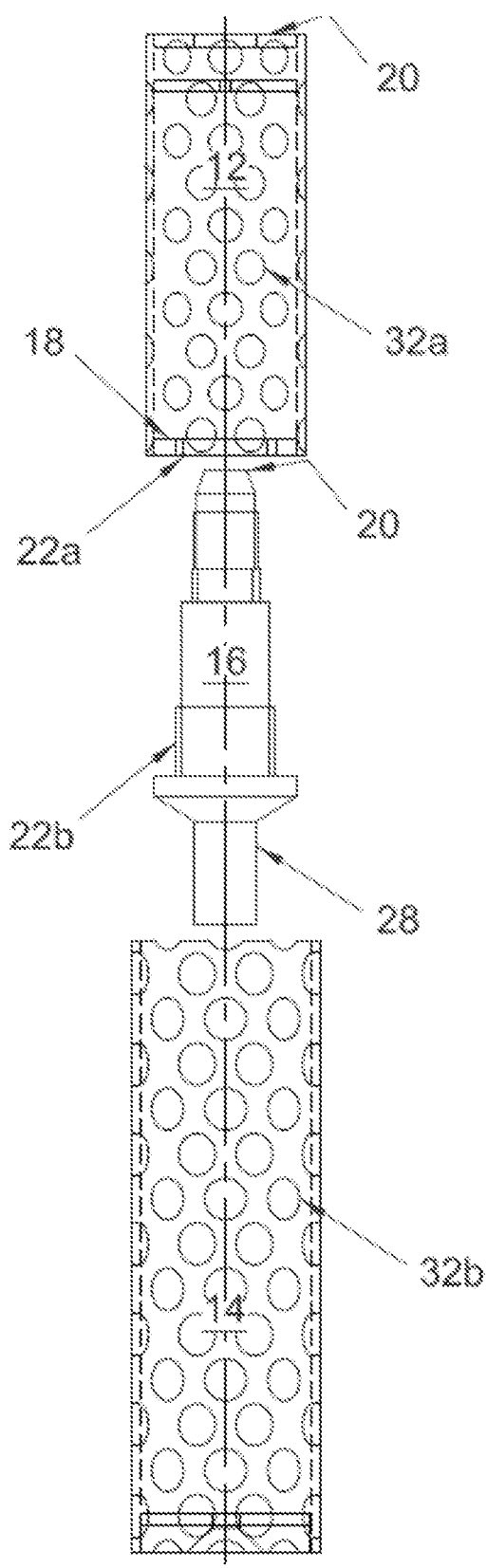
FIG. 2 is a first exploded view of the igniter assembly embodiment of FIG. 1.
Figure 3:
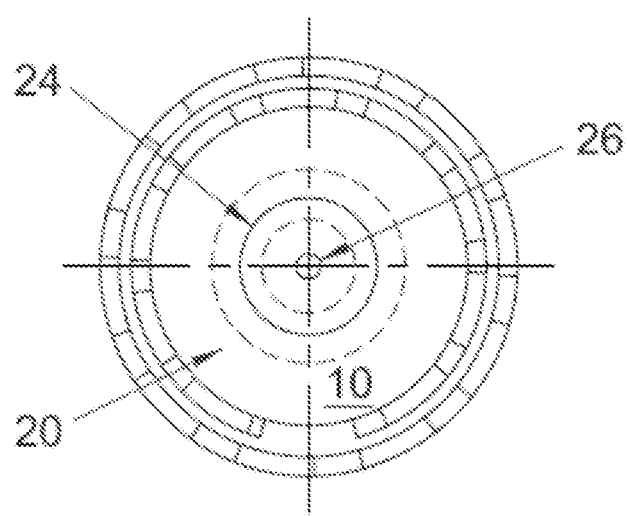
FIG. 3 is an end view of the igniter assembly embodiment of FIG. 1.
Figure 4:
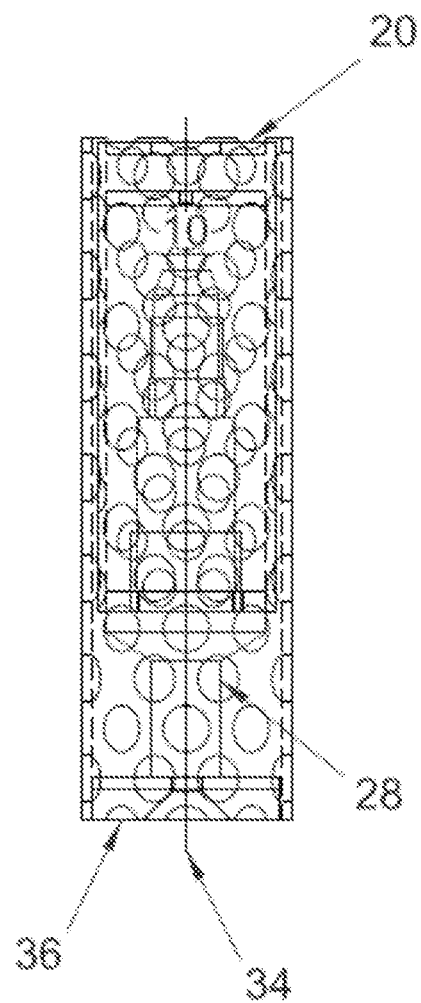
FIG. 4 is a side view of the igniter assembly embodiment of FIG. 1.
Figure 6:
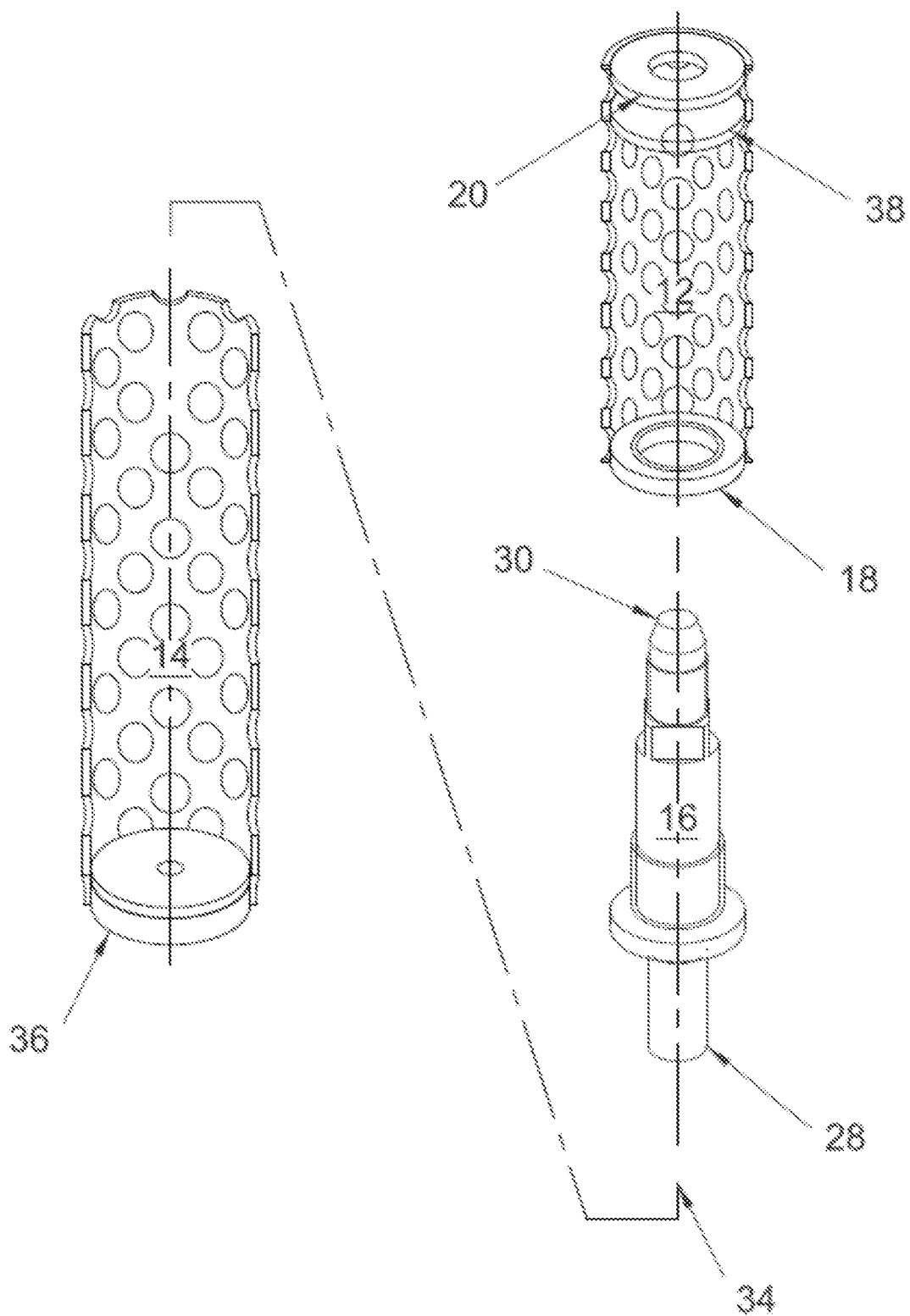
FIG. 6 is a second exploded view of the igniter assembly embodiment of FIG. 1.

FIGS. 1, 3 and 4 show an embodiment of an igniter assembly 10 of the present invention, whereas FIGS. 2 and 6 show an exploded view of the constituent components of the igniter assembly 10. FIGS. 2 and 6 will be discussed in greater detail in the sections that follow.

The igniter assembly 10 may include an inner holder in the form of an inner tubular member 12, an outer housing in the form of an outer tubular member 14 and a piezo electric ignition source 16. The inner tubular member 12 and the outer tubular member 14 typically have a hollow cylindrical shape. Whilst this embodiment of the invention defines inner and outer tubular members each comprising a hollow cylindrical shape, other tubular shapes with different cross sections, such as triangular, square and hexagonal are also envisaged.

The inner tubular member 12 and outer tubular member 14 are typically constructed from a heat resistant material, such as mild steel. Whilst this embodiment of the invention defines inner and outer tubular members constructed from mild steel, other heat resistant materials such as brass, copper, stainless steel and cast iron, are also envisaged. Other materials such as injection moulded plastics and printed material may also be considered as materials suitable for construction of the inner tubular member 12 and the outer tubular member 14 depending on their ability to resist heat and satisfy the electrical earthing requirements of the piezo electric ignition source.

In one form of the invention, the inner tubular member 12 and outer tubular member 14 may each be formed from a flat sheet of material. The flat sheet of material may be then bent or rolled to form a cylinder. The ends of the sheet can then be welded to form a seam which joins the ends of the sheet and secures the sheet into a cylindrical shape.

The inner tubular member 12 has a first end 18. The first end 18 may include a connecting element 22a which is complementary with a connecting element 22b on the piezo electric ignition source 16. The connection 22a may be a female screw thread connector and the connecting element 22b may be a male screw thread connector. However, other types of connections such as friction fittings, bayonet connections, and detents are also considered within the scope of the invention.

Figure 5:
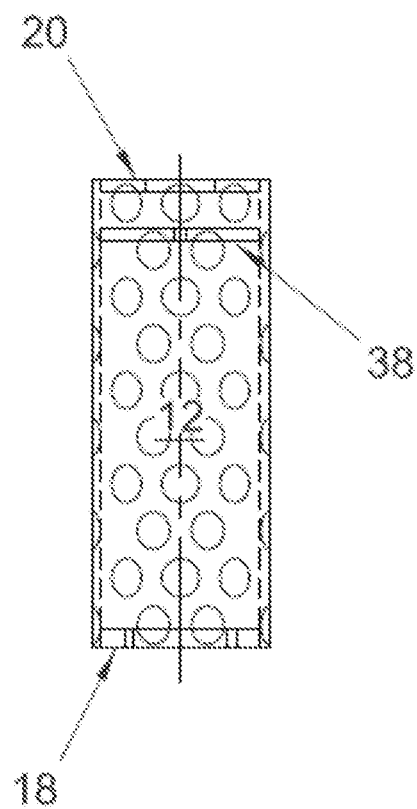
FIG. 5 is a cutaway view of the inner tubular member of the igniter assembly embodiment of FIG. 1.

The inner tubular member 12 also has a second end 20. FIG. 3 shows an end view of the igniter assembly 10. As can be seen from FIG. 3, the second end 20 of the inner tubular member 12 has a surface 24 configured to receive a tip of an oxy fuel torch. In the context of this invention, the term "configured" is taken to include the size and/or shape of the tip of the oxy fuel torch. The second end 20 of the inner tubular member 12 includes an aperture 26, as shown in FIG. 3, to allow passage of gas through the second end of the inner tubular member. This feature allows the gases from the oxy fuel torch to contact the spark from the piezo electric ignition source. In some embodiments the second end 20 of the inner tubular member 12 may include a metering plate 38. FIG. 5 is a cutaway view of the inner tubular member showing the metering plate 38. The metering plate 38 consists of a plate with at least one opening that is sized for the purpose of the controlling the flow of fuel/oxygen into the igniter assembly. The flow of fuel/oxygen is controlled to avoid the displacement of ambient air. The displacement of ambient air can have negative effects on the combustion process.

The outer tubular member 14 is typically larger in diameter and length than the inner tubular member 12. The outer tubular member 14 is dimensioned to enable the inner tubular member 12 to be received within the outer tubular member 14.

The outer tubular member 14 may have a solid base 36, as shown in FIGS. 1 & 4, to enable the igniter assembly to be supported vertically on a surface. The solid base 36 also improves the overall structural rigidity of the igniter assembly 10. The outer tubular member 14 may also include an attachment means for attaching the igniter assembly to a structural member at a worksite. Preferably, the attachment means is in the form of a magnet, such as a permanent magnet or an electromagnet. Preferably, the attachment means is incorporated into the solid base 36.

Figure 7:
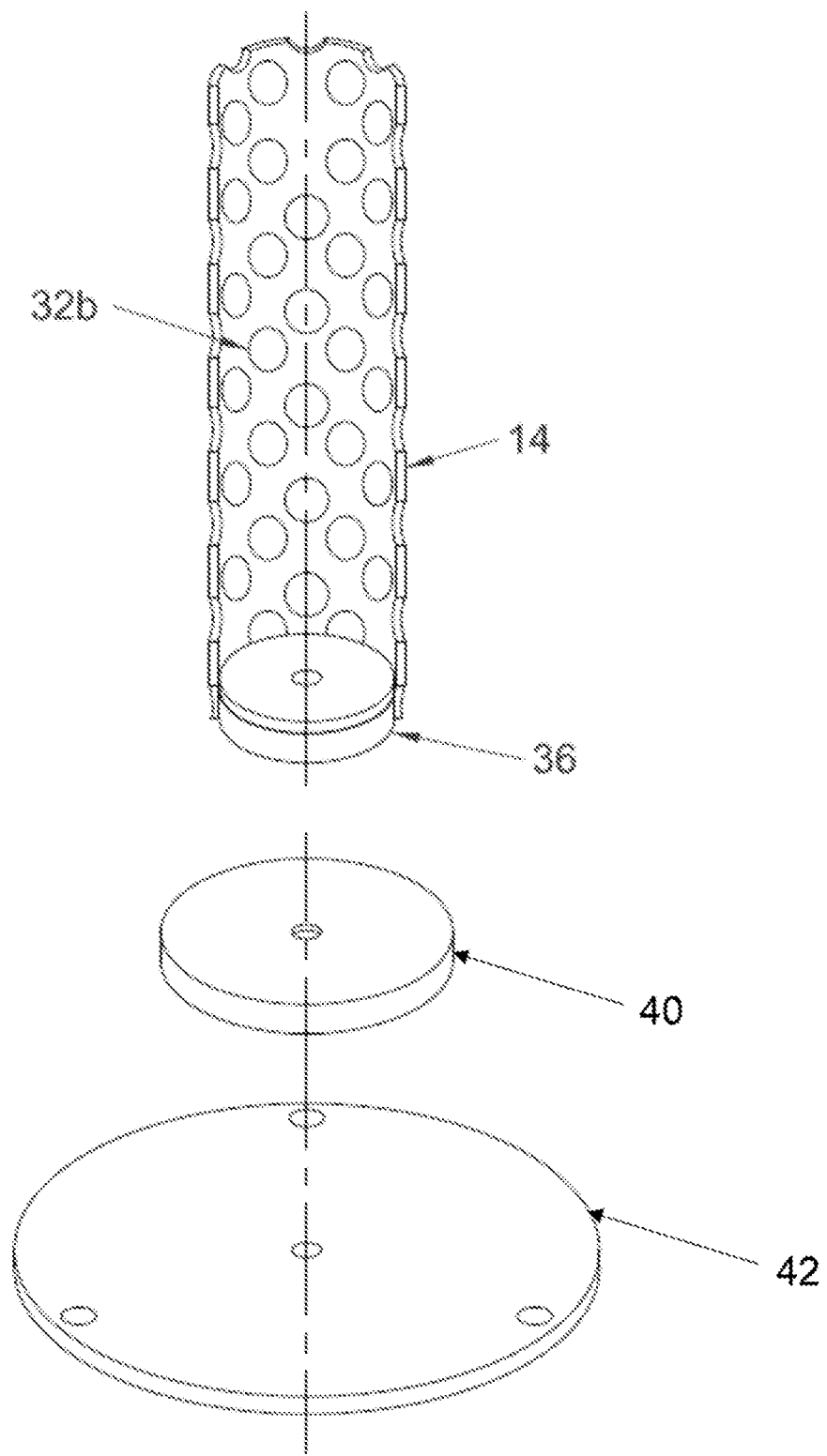
FIG. 7 is a cutaway view of the outer tubular member including an attachment means of the igniter assembly embodiment of FIG. 1.

FIG. 7 illustrates alternative attachment means 40 and 42 which may be attached to solid base 36, preferably using a screw, to detachably connect the igniter assembly 10 to a metallic surface. Either or both discs 40 and 42 may be magnetic. Disc 40 is preferably magnetised to attach the device to a metallic surface while disc 42 includes apertures that enable the disc to be screwed onto a metallic or non-metallic surface.

An advantage of this feature is that the igniter assembly can be temporarily fixed in position which therefore reduces the risk of losing or misplacing the igniter assembly. This provides a further advantage of enabling the igniter assembly to be operated without having to manually handle the igniter assembly, as the magnet can act to firmly hold the igniter assembly against a structural member while the operator uses the tip of the oxy fuel torch to operate the igniter assembly. A further advantage provided by the magnetic base is that it allows the igniter assembly to be used in confined work spaces where manually manipulating a standard igniter would be difficult due to restrictions in movement.

The inner tubular member 12 may be permeable to allow the passage of gas therethrough. The permeability of the inner tubular member 12 may be achieved by providing holes 32a in the wall of the inner tubular member 12. However, other means of providing a permeable inner tubular member 12, such as slits, perforations and porous membranes are also envisaged. The permeability extends the entire length of the inner tubular member 12.

The outer tubular member 14 may also be permeable to allow the passage of gas therethrough. The permeability of the outer tubular member 14 may be achieved by providing holes 32b in the wall of the outer tubular member 14. However, other means of provided a permeable inner tubular member 14, such as slits, perforations and porous membranes are also envisaged. The permeability extends the entire length of the outer tubular member 12.

Accordingly, both the inner tubular member 12 and the outer tubular member 14 are porous. The advantage of providing a porous inner tubular member and/or outer tubular member is that following the ignition and combustion of oxy fuel gases, temperature and pressure rapidly build up within the inner and outer tubular members. Extreme temperature and pressure rises may result in damage to the igniter assembly and/or injure personnel. The permeability of the porous inner and outer tubular members assists in diffusing the build-up of hot gases and thus reducing the resulting temperature and pressure rises.

In one embodiment, the holes 32a and 32b are arranged such that they provide a passage for gas through the igniter assembly, irrespective of rotational alignment of the inner tubular member 12 in relation to the outer tubular member 14.

The piezo electric ignition source 16 may be a standard OEM piezo electric igniter commonly used in ovens, grills and the like.

The piezo electric ignition source 16 may typically have an actuator 28 such as a spring biased button or switch, which when depressed activates the piezo electric ignition source 16 to produce a spark that permeates from the spark discharge area 30 of the piezo electric ignition source 16 to the internal side wall of the inner tubular member 12 which provides a means of electrically earthing the spark from the piezo electric ignition source 16.

Figure 8:
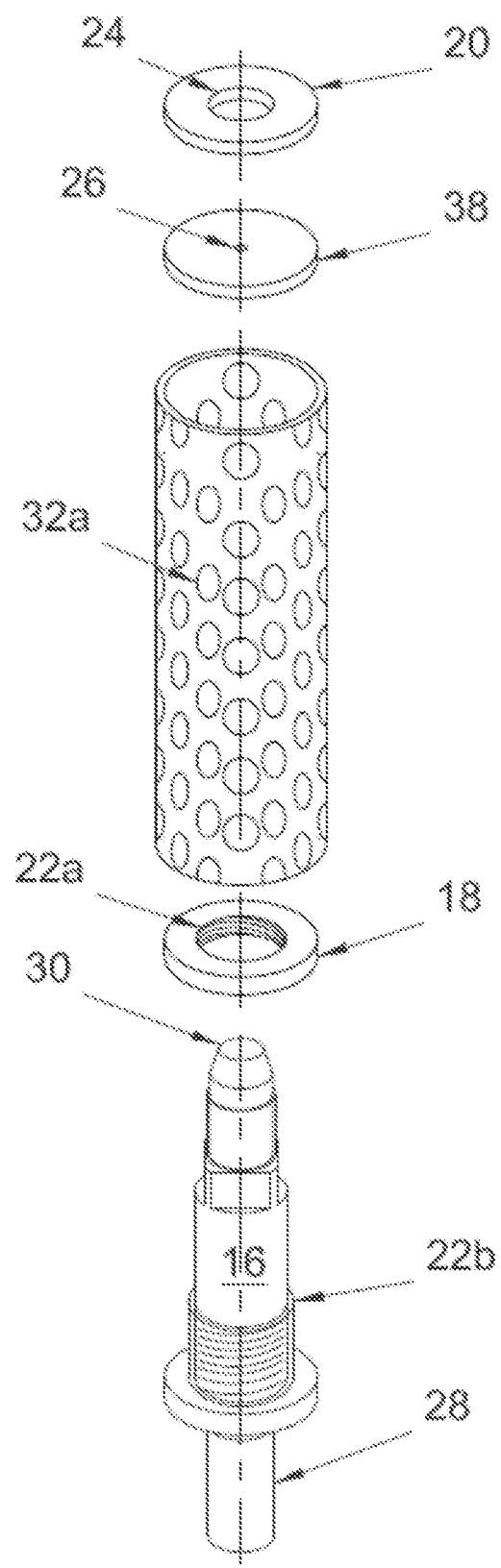
FIG. 8 is an exploded view of the inner tubular member of the igniter assembly embodiment of FIG. 1 including a piezo electric ignition source.

To assemble the igniter assembly, the piezo electric ignition source 16 is first coupled to the inner tubular member 12 by engaging the male threads of the connecting element 22b with the female threads of the connecting element 22a (see FIG. 8). Once the piezo electric ignition source 16 and the inner tubular member 12 are coupled, the resulting subassembly is inserted inside the outer tubular member 14 with the first end 18 of the inner tubular member 12 being inserted first. The rim of the outer tubular member 14 may be crimped around the second end 20 of the inner tubular member 12 to thus retain the inner tubular member 12 inside the outer tubular member 14. One advantage of housing the piezo electric ignition source 16 within the inner and outer tubular members, by way of the above assembly, is that the piezo electric ignition source 16 is shielded by the inner and outer tubular members from damage. This improves the overall durability of the igniter assembly.

One method of operating the igniter assembly to ignite an oxy fuel torch involves engaging the tip of the oxy fuel torch with the second end 20 of the inner tubular member 12 and then pressing down the tip of the oxy fuel torch to move the inner tubular member 12 relative to the outer tubular member 14 along a longitudinal axis 34, as shown in FIG. 4. The tip of the torch is aligned with the surface 24 and received within the aperture 26. The tip of the torch is contacted with the metering plate 38 to press down the inner tubular member 12. Pressing the inner tubular member 12 down forces the actuator 28 from a relaxed state to a compressed state. When the actuator 28 transitions into the compressed state, this triggers the piezo electric ignition source to produce a spark which ignites the oxy fuel torch to produce a flame. An advantage of using the igniter assembly by way of the above method, is that the operator of the oxy fuel torch can ignite the oxy fuel torch without needing to directly manually handle the igniter assembly. Therefore, the igniter assembly of the present invention need not be positioned by hand in front of the oxy fuel torch tip. As a result of this, the igniter assembly reduces the risk of burns/injury to the hands of the operator and improves the overall safety and ease of operation of the task.

It is to be understood that the above description and the accompanying figures are only intended to illustrate the present invention. It will be obvious to a person skilled in the art that the invention can be varied and modified without departing from the scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

KEY

10: Igniter assembly
12: inner tubular member
14: outer tubular member
16: piezo electric ignition source
18: first end
20: second end
22a: connecting element
22b: connecting element
24: surface configured to receive tip of oxy fuel torch
26: aperture
28: actuator
30: spark discharge area
32a: holes
32b: holes
34: longitudinal axis
36: solid base
38: metering plate
40: a first attachment means
42: a second attachment means

The invention claimed is:

1. An igniter device comprising:
a holder for a piezo electric ignition source, the holder comprising a first end and a second end, wherein the first end of the holder is coupled to a piezo electric ignition source including an actuator, and the second end of the holder has a surface configured to receive a tip of an oxy fuel torch; and
an attachment means to releasably attach the igniter device to a support member;
wherein, the actuator is moveable from a relaxed state to a compressed state by pressing the tip of the oxy fuel torch against the surface to thereby activate the piezo electric ignition source to produce a spark for igniting the oxy fuel torch to produce a flame when the igniter device is attached to the support member.

2. An igniter device comprising:
an outer housing;
an inner holder for a piezo electric ignition source, the inner holder being positioned within and movable relative to the outer housing;
the inner holder comprising a first end and a second end;
the first end of the inner holder being arranged to be coupled to a piezo electric ignition source including an actuator;
the second end of the inner holder having a surface configured to receive a tip of an oxy fuel torch and including an aperture to allow passage of gas through the second end of the inner holder; and
an attachment means to releasably attach the igniter device to a support member;
wherein, when the inner holder is moved relative to the outer housing from a first position to a second position by pressing the tip of the oxy fuel torch against the surface, the actuator moves from a relaxed state to a compressed state to thereby activate the piezo electric ignition source to produce a spark for igniting the oxy fuel torch to produce a flame when the igniter device is attached to the support member.

3. The igniter device of claim 2, wherein the outer housing includes the attachment means for releasably attaching the igniter device to the support member.

4. The igniter device of claim 3, wherein the attachment means is a magnet.

5. The igniter device of claim 2, wherein the outer housing and inner holder comprise inner and outer tubular members with the inner tubular member being positioned within and movable relative to the outer tubular member.

6. The igniter device of claim 2, wherein at least one of the inner holder and outer housing is permeable to allow the passage of gasses therethrough.

7. The igniter device of claim 2, wherein both the inner holder and outer housing are permeable to allow the passage of gasses therethrough.

8. The igniter device of claim 2, wherein, in an assembled condition, the inner holder and outer housing are arranged such that the longitudinal axes of both the inner holder and outer housing are parallel.

9. The igniter device of claim 8, wherein the longitudinal axes of both the inner holder and the outer housing are substantially coaxial.

10. The igniter device of claim 8, wherein the relative movement of the inner holder with respect to the outer housing is via a linear translation along the parallel longitudinal axis of the inner holder and outer housing.

11. The igniter device of claim 2, wherein the piezo electric ignition source is releasably coupled to the inner holder by way of a threaded connection.

12. An igniter assembly comprising:
an outer housing;
an inner holder for a piezo electric ignition source, the inner holder being positioned within and movable relative to the outer housing;
the inner holder comprising a first end and a second end;
the first end of the inner holder being coupled to a piezo electric ignition source including an actuator;
the second end of the inner holder having a surface configured to receive a tip of an oxy fuel torch and including an aperture to allow passage of gas through the second end of the inner holder; and
an attachment means to releasably attach the igniter device to a support member;
wherein, when the inner holder is moved relative to the outer housing from a first position to a second position by pressing the tip of the oxyfuel torch against the surface, the actuator moves from a relaxed state to a compressed state to thereby activate the piezo electric ignition source to produce a spark for igniting the oxy fuel torch to produce a flame when the igniter device is attached to the support member.

13. The igniter assembly of claim 12, wherein the outer housing includes the attachment means for releasably attaching the igniter assembly to the support member.

14. The igniter device of claim 13, wherein the attachment means is a magnet.

15. A method for using an igniter device according to claim 2 to ignite an oxy fuel torch,
wherein the method comprises the steps of:
attaching the igniter device to a support member;
engaging the tip of the oxy fuel torch with the second end of the inner holder;
pressing down the tip of the oxy fuel torch against the surface to move the inner holder relative to the outer housing, in order to move the actuator from a relaxed state to a compressed state and thereby activate the piezo electric ignition source to produce a spark which ignites the oxy fuel torch to produce a flame when the igniter device is attached to the support member.

16. The method according to claim 15, including a step of:
returning the inner holder from a compressed state to a relaxed state.

* * * * *